United States Patent
Grier

(10) Patent No.: US 9,216,356 B2
(45) Date of Patent: Dec. 22, 2015

(54) INTEGRATED GAMING SYSTEM AND METHOD FOR MANAGING GAMEPLAY ACROSS MULTIPLE PLATFORMS

(71) Applicant: Daemeon D. Grier, Scottsdale, AZ (US)

(72) Inventor: Daemeon D. Grier, Scottsdale, AZ (US)

(*) Notice: Subject to any disclaimer, the term of this patent is extended or adjusted under 35 U.S.C. 154(b) by 159 days.

(21) Appl. No.: 13/908,362

(22) Filed: Jun. 3, 2013

(65) Prior Publication Data
US 2014/0357344 A1 Dec. 4, 2014

(51) Int. Cl.
| A63F 13/30 | (2014.01) |
| A63F 13/352 | (2014.01) |
| G07F 17/32 | (2006.01) |
| A63F 13/63 | (2014.01) |
| A63F 13/46 | (2014.01) |

(52) U.S. Cl.
CPC ............ *A63F 13/352* (2014.09); *A63F 13/30* (2014.09); *A63F 13/46* (2014.09); *A63F 13/63* (2014.09); *G07F 17/32* (2013.01)

(58) Field of Classification Search
CPC ..... A63F 13/30; A63F 13/323; A63F 13/327; A63F 13/33; A63F 13/332; A63F 13/335; A63F 13/35; A63F 13/352; A63F 13/79; A63F 2300/50; A63F 2300/51; A63F 2300/513; A63F 2300/531; A63F 2300/55; A63F 2300/5546; A63F 13/46
See application file for complete search history.

(56) References Cited

U.S. PATENT DOCUMENTS

| 6,012,984 | A | 1/2000 | Roseman |
| 6,884,172 | B1 * | 4/2005 | Lloyd et al. ............... 463/42 |
| 7,985,132 | B2 | 7/2011 | Walker |
| 8,075,396 | B2 | 12/2011 | Roemer |
| 8,224,990 | B2 | 7/2012 | Teicher |
| 8,333,641 | B2 | 12/2012 | Sullivan |
| 8,417,785 | B2 | 4/2013 | Fisher |
| 8,425,301 | B2 | 4/2013 | Lyons |
| 8,449,386 | B2 | 5/2013 | Englman |
| 2001/0044339 | A1 * | 11/2001 | Cordero et al. ............... 463/42 |
| 2008/0188312 | A1 | 8/2008 | Seelig |
| 2008/0254893 | A1 | 10/2008 | Patel |
| 2011/0256936 | A1 | 10/2011 | Walker |
| 2012/0315993 | A1 * | 12/2012 | Dumont et al. ............... 463/42 |
| 2013/0079147 | A1 * | 3/2013 | Merati ............... 463/42 |
| 2013/0095914 | A1 * | 4/2013 | Allen et al. ............... 463/25 |

OTHER PUBLICATIONS

Wilhelm; Alex, "How Major League Gaming went all-in, landed on its feet, and raised millions", article, Mar. 13, 2012, 9 pages, www.thenextweb.com, http://thenextweb.com/insider/2012/03/13/how-major-league-gaming-went-all-in-landed-on-its-feet-and-raised-millions/.

* cited by examiner

*Primary Examiner* — Damon Pierce
(74) *Attorney, Agent, or Firm* — IDP Patent Services; Olav M. Underdal

(57) ABSTRACT

An integrated gaming system for managing gameplay, and tracking and awarding rewards, across multiple gaming platforms; which connects an integrated gaming application, executing on a gaming device, in a browser, or a general computing devices; with an integrated gaming server, which can communicate with a number of connected external gaming servers. Furthermore disclosed is a computer-implemented integrated gaming method for reviewing reward levels, reviewing available games, playing games and obtaining rewards. The rewards can be additional games access, physical items, monetary awards, or the right to participate in events with celebrities, well-known athletes, or notable game players.

8 Claims, 5 Drawing Sheets

Integrated Scoring Table 300

| Integrated Reward | SYSTEM_Y_External_Score | SYSTEM_Y_External_Score | ... |
|---|---|---|---|
| Reward_1 | SYS_X_Score_1 | SYS_Y_Score_1 | ... |
| Reward_2 | SYS_X_Score_2 | SYS_Y_Score_2 | ... |
| .... | ... | ... | ... |
| Reward_a | SYS_X_Score_a | SYS_Y_Score_a | ... |
| .... | ... | ... | ... |
| Reward_n | SYS_X_Score_n | SYS_Y_Score_n | ... |

302 / 304 / 306 / 308

Integrated Gaming method

FIG. 3

Integrated Scoring Table

| Integrated Reward | SYSTEM_Y_External_Score | SYSTEM_Y_External_Score | ... |
|---|---|---|---|
| Reward_1 | SYS_X_Score_1 | SYS_Y_Score_1 | ... |
| Reward_2 | SYS_X_Score_2 | SYS_Y_Score_2 | ... |
| .... | ... | ... | ... |
| Reward_a | SYS_X_Score_a | SYS_Y_Score_a | ... |
| .... | ... | ... | ... |
| Reward_n | SYS_X_Score_n | SYS_Y_Score_n | ... |

Integrated Gaming Server

INTEGRATED GAMING SYSTEM AND METHOD FOR MANAGING GAMEPLAY ACROSS MULTIPLE PLATFORMS

CROSS-REFERENCE TO RELATED APPLICATIONS

Not applicable.

FIELD OF THE INVENTION

The present invention relates generally to the field of online video gaming, and more particularly to managing gameplay and awarding incentives across multiple online gaming platforms.

BACKGROUND OF THE INVENTION

Video games developed from early prototypes in the late 1940's and 1950's. The modern era of video games was initiated in the 1970's to large degree driven by popular games such as Pong and Space Invaders. During the last decade video game consoles and their attached game controllers have become sophisticated computational devices, often linked to an online network component, offering centralized management, and collaborative gameplay.

Xbox Live and the PlayStation Network are examples of popular platforms that have remained successful in the marketplace, despite of economic woes that have undermined the global economy, including the video game industry. Online console video game participation has grown well beyond 100 million users (combined), in large part thanks to the integration of entertainment applications. Adding these applications has evolved the online gaming network into an interactive entertainment system for video games, movies, music and consumerism.

Paralleling this development of online gaming, celebrities have publicly discussed their interest in gaming. It is well known that a large contingent of celebrities and athletes play videogames through Xbox Live, PlayStation Network, and other gaming platforms. Although these individuals tend to keep a low profile online, incentivized gaming would encourage them to play more openly. By playing video games for a few hours a week, a celebrity could simultaneously benefit charity work and promote his or her public image.

There are online gaming services, which provide rewards for gaming accomplishment. However, they only provide rewards for play within their own restricted and proprietary game platforms. No current online gaming services provide integrated access to other external gaming platforms. In addition, they do not provide celebrity related rewards or access to game play with celebrity participation.

There are some gaming sites and gaming platform that reward game play on their proprietary platform with prizes, and others that allow users to watch celebrities play against each other, but at present there are no online gaming applications that allows everyday gamers to compete against celebrities.

In addition, there are no sites or platforms that offer games across multiple external systems, for example offering applications that are integrated with both Xbox Live and the PlayStation Network, or any other major console and gaming network provider.

The present invention builds on existing online gaming products, services, and platforms, by allowing users to compete across multiple platforms, and accumulate rewards and prices in a central system, tied to their game performance in various third-party gaming systems. Additionally, the rewards system provides access to meet with or play online games with celebrities or other notable persons.

SUMMARY OF THE INVENTION

The foregoing needs are met, to a great extent, by the present invention, wherein in aspects of this invention, enhancements are provided to the existing model of online gaming, to allow managed access to a plurality of external gaming platforms, and accrue rewards based on gameplay accomplishments in the external gaming platforms.

In an aspect of the integrated gaming system, the network contains an integrated gaming application executing inside external proprietary gaming platforms, such as Xbox Live and the PlayStation Network. The application is accessible through the opening screen or application menu in the external gaming platform.

In a related aspect, the integrated gaming application can execute as a browser-based application, or as an application on a computer or mobile device, such as a PC, laptop, tablet, smart phone, or similar device.

In another aspect, everyday users can gain rewards based on game accomplishments, and compete against each other for prizes, as well as the chance to play against celebrities.

In a related aspect, player rewards are aggregated in the integrated gaming system, based on accomplishments in external gaming platforms, by translating the proprietary rewards in these platforms to an integrated score system, which enables players to compare results achieved in different external games and platforms.

In another aspect, players can enter tournaments that are setup, controlled and managed in the integrated gaming system, with game play actually executing in the external gaming platforms.

In a related aspect, players can gain access to tournament leagues that offer a structured competitive environment for players of comparably ability. Players earn points and associated tournament league standing by competing in game sessions on the external gaming platforms.

In another aspect, players maintain their identity on the integrated gaming system, which is linked via an identity management function to other distinct profiles on associated external gaming platforms. This relational structure thereby allows the integrated gaming system to maintain an aggregated status of accomplishments and results on the various external gaming platforms.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 illustrates an integrated scoring table according to an embodiment of the invention.

DETAILED DESCRIPTION

Figure 1:
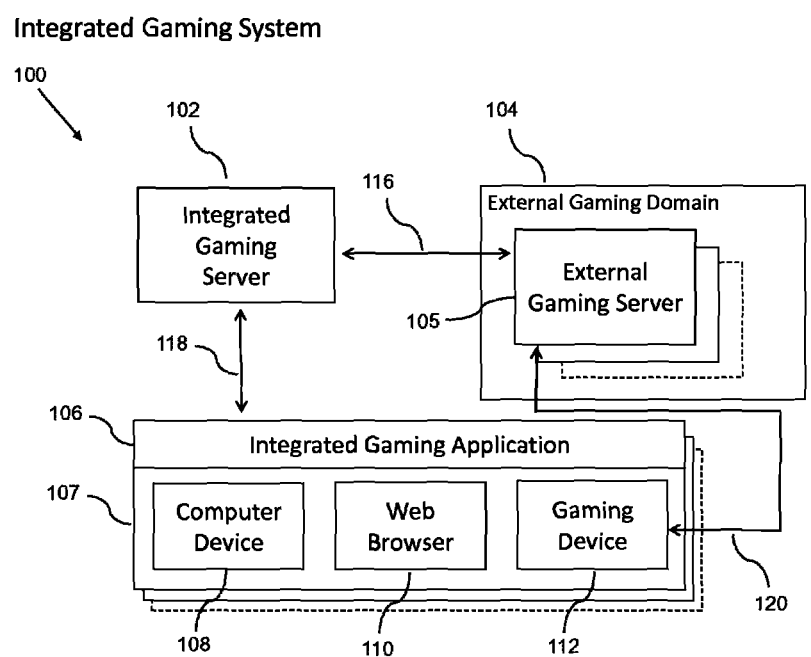
FIG. 1 is a schematic diagram illustrating a system for integrated gaming according to an embodiment of the invention.

An embodiment of an integrated gaming system for managing gameplay across multiple gaming platform describes a computer-implemented system that
  a. connects game players, also referenced as users or members, playing a multitude of different games on different external game platforms;
  b. awards rewards, also called incentives, for gameplay accomplishments on the external platforms, including incentive opportunities to play with notable persons, such as celebrities, well known athletes, and professional gamers.

In the following we describe the structure of such an embodiment in the form of a computer-implemented system with reference to FIG. 1, in such manner that like reference numerals refer to like components throughout; a convention that we shall employ for the remainder of this specification. An integrated gaming system 100 can include
  a. an integrated gaming server 102;
  b. an external gaming domain 104, comprised of one or more external gaming servers 105; and
  c. an integrated gaming application 106, which is executing on a local computing platform 107; the local computing platform 107 including either a gaming device 112, a web browser 110, or a computing device 108, or a combination of these.

In a further related embodiment of the integrated gaming system 100, a plurality of integrated gaming applications 106 can be connected to the integrated gaming server 102, each of the gaming applications executing on an instance of a local computing platform 107 comprising either a computer device 108, a web browser 110, or a gaming devices 112, or a combination of these components 108 110 112.

In an example embodiment, the external gaming domain 104, could be configured to contain the Xbox Live external gaming server and the PlayStation Network external gaming server, and a large number of users can be using the system, each user employing a specific instance of the integrated gaming application 106, each executing on a specific local computing platform 107, for example either an Xbox or PlayStation game console, with attached game controller devices.

In an embodiment, the computing device 108 can be part of a general computer, such as a personal computer (PC), a tablet, a notebook, a laptop, a workstation, a server, a mainframe computer, a personal digital assistant (PDA), a smart phone, a mobile device, a smart television, a similar device, or some combination of these. Such a device can include a memory, a processor, input/out components, and other components that are common for general computers, all of which are well known in the art and therefore will not be further elaborated or described herein.

Figure 4:
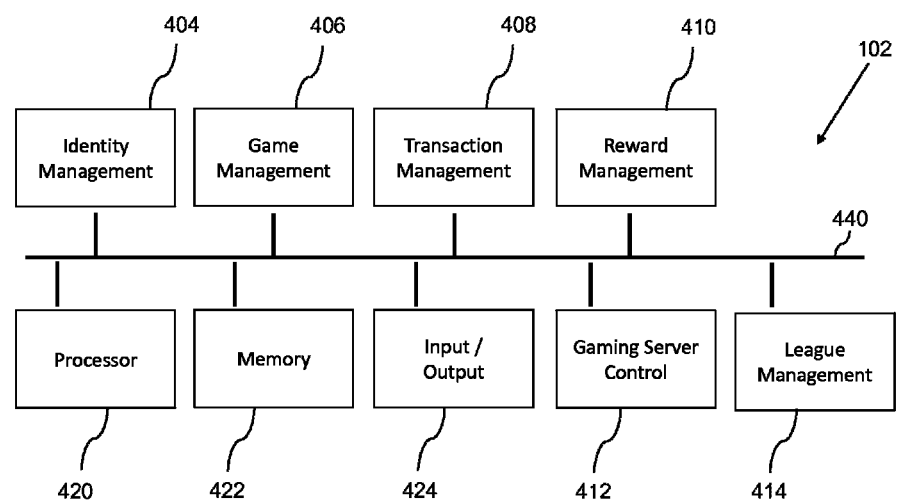
FIG. 4 is a schematic diagram illustrating an integrated gaming server according to an embodiment of the invention.

In an embodiment, as illustrated in FIG. 4, the integrated gaming server 102, includes a processor 420, a memory 422, and an input/output 424, an identity management component 404, a gaming server control component 412, a game management component 406, a transaction management component 408, a reward management component 410, and a league management component 414, all connected via a data bus 440.

It shall be understood that the above mentioned components of the integrated gaming server 102 are to be interpreted in the most general manner, so that for example the processor 420, can include a single physical microprocessor or microcontroller, a cluster of processors, a datacenter or a cluster of datacenters, a computing cloud service, and the like; the memory 422, can includes random access memory and other forms of temporary storage, and hard disks, hard disk clusters, cloud storage services, and other forms of permanent storage; and the input/output 424, can include a plurality of well known input/output devices, such as screens, keyboards, pointing devices, motion trackers, and so forth.

Furthermore it shall be understood that the the integrated gaming server 102 can include a number of other components that are well known in the art of general computer devices, and therefore shall not be further described herein. This can include system access to common functions and hardware, such as for example via operating system layers such as Windows Server, Linux Server, and similar operating system software, but can include configurations wherein application services are executing directly on server hardware or via a hardware abstraction layer other than a complete operating system.

The gaming device 112 can be part of a specialized gaming device, such as an Xbox, PlayStation or similar game console, including portable gaming consoles, such as the PlayStation Vita, and can furthermore include attached game controller devices, including hand held devices, and other components that are attached to the game console.

The gaming device 112 can communicate directly with a corresponding external gaming server 105, via the particular manufacturer communication channel, which may be proprietary or part of an open application programming interface. An example of this could be an Xbox console gaming device, which communicates with the external gaming server of the Xbox Live gaming network. This communication 120 is not directly controlled by the integrated gaming server 102.

The integrated gaming application 106 and the local computing platform 107 can include programming code, such as source code, object code or executable code, stored on a computer-readable medium that can be loaded into the memory and processed by the processor in order to perform the desired functions.

In another alternative embodiment, the integrated gaming application 106, and the local computing platform 107 can be, respectively, a browser based application, and a standard web browser.

In another alternative embodiment, the integrated gaming application 106 and the local computing platform 107, can be part of a native application executing on top of an operating system and computer execution environment, such as for example Windows or iOS, Apple O/S, operating within a computer device 108.

In an embodiment, the integrated gaming server 102 communicates with the external gaming servers 105, in the external gaming domain 104, over a communication channel 116, which can be the general Internet, a Wide Area Network or a Local Area Network, or another form of communication network, transmitted on wired or wireless connections.

In a related embodiment, the integrated gaming server 102, communicates with instances of the integrated gaming application 106, of which separate instances are used by users that are registered on the integrated gaming server 102, communicating over a communication channel 118, which can be the general internet, a Wide Area Network or a Local Area Network, or another form of communication network, transmitted on either wired or wireless connections.

In a related embodiment of the integrated gaming system 100, an identity management component 404 of the integrated gaming server 102 is established, wherein players can enter a user profile, which is stored on the integrated gaming server 102, such that the user profile also contains information on the user's associated user profile on each separate external gaming server. This associated external gaming server user profile can contain authentication information, such as passwords, allowing the user to authorize the integrated gaming server to log on to the external gaming server on behalf of the user. This relational structure thereby allows the integrated gaming system to store and process an aggregated status of accomplishments and results on the various external gaming platforms.

In a related embodiment of the integrated gaming system 100, configured with a gaming server control component 412, the integrated gaming server 102 can log on to a particular external gaming server 105 to perform a plurality of external gaming server functions, via an application programming interface of the external gaming server, including:
 a. Retrieve game history and results for user;
 b. Retrieve list of online users, filtered by various criteria, such as game type, user category, etc.
 c. Establish and start a single-player game session for a user.
 d. Establish a two-player game session for two users.
 e. Establish a multi-player game session for a list of users.

In such an embodiment of the integrated gaming system 100, configured with a gaming server control component 412, the initiation of a game session, can include that the external gaming server 105, upon receipt of a request from the integrated gaming server 102, can initiate communication with one or more corresponding gaming devices 112, to start game sessions on these gaming devices 112. This communication and game control functionality is part of the normal, proprietary technical capabilities of the external gaming server 105 and its corresponding gaming device 112, which is controlled by the external gaming server 102 via an open application programming interface. In some embodiments, such an application programming interface may support indirect communication with the gaming device 112, via a communication channel 116 with the external gaming server 105, which then communicates with the gaming device 112, via another communication channel 120. In other embodiments, the application programming interface may support direct communication with the gaming device 112, via another communication channel 118.

In a related embodiment of the integrated gaming system 100, configured with a transaction management component 408, the integrated gaming server 102 stores and aggregates information in memory 422 on user game-play activities retrieved from connected external gaming servers 105, and aggregates this information per user, so that users can win rewards or receive incentives based on their game play accomplishments. Such incentives can be in the form of internal status recognition, physical prizes, monetary rewards, and right to participate in specific gaming or meeting events.

In a related embodiment of the integrated gaming system 100, configured with a reward management component 410, players rewards are aggregated in the integrated gaming system, based on accomplishments in external gaming platforms, by translating the proprietary scores or reward levels in these platforms to an integrated score system, via lookup in an integrated scoring table 300, shown in FIG. 3, which enables players to compare results achieved in different external games and platforms. As an example, the score calculation for a particular gameplay accomplishment on a specific external gaming system, System Y, represented by the column System_Y_External_Score 304, can be done by finding the corresponding external score or reward, Sys_Y_Score_a 308, and translating this to a corresponding integrated score, Reward_a 306, in the same row of the Integrated_Score column 302. The score matching on the external system can be an equality match, a match within a numeric range, a textual pattern match, a pattern match, or a mathematical function match. The reward translation can further include a numeric function transformation.

In a further related embodiment of the integrated gaming system 100, the reward management component 410 can include a reward availability structure, stored in memory, which can identify available rewards, list the count for specific rewards available, the period of availability, status of award of a reward, completion of award, and other meta information related to an award. As an example the reward availability structure could record that 50 tablet devices would be available as a reward on a monthly basis. In this case awards could be issued during a given month until the 50 tablets had been issued to users of the integrated gaming system 100, and in the beginning of the following month the reward availability structure, would be updated in the memory to reset the tablet rewards available to 50, and users would again be able to win this particular reward.

In a related embodiment of the integrated gaming system 100, configured with a game management component 406, players can enter managed games, including single player games, multi-player games, and tournaments that are setup, stored in memory, controlled and managed in the integrated gaming system 100, with game play actually executing on gaming devices 112, related to or managed via an external gaming server 105.

In a related embodiment of the integrated gaming system 100, where the integrated gaming server 102 further comprises a league management component 414, players can be associated with a tournament league via their user profile, and thereby gain access to tournament leagues that offer a structured competitive environment for players of comparable ability. Players earn points and associated tournament league standing by competing in tournament league game sessions on the external gaming servers. Results of games sessions associated with the tournament league can be stored in memory.

The tournament league can be comprised of:
 a. a predetermined set of users, who are qualified for membership in the tournament league, wherein the qualification criteria can include a reward, and
 b. A predetermined schedule of game sessions, wherein results from any individual game session are stored in the memory 422, and overall league rankings are processed by the processor 420, and stored in the memory 422.

Additionally, in an embodiment of the integrated gaming system 100, the integrated gaming application 106; executing on either the a external game device 112, a web browser 110, or a computing device 108; can communicate information to the user and request user input by way of an interactive, menu-driven, visual display-based user interface, or graphical user interface (GUI). The user interface can be executed, for example, on a personal computer (PC) with a mouse and keyboard, with which the user may interactively input information using direct manipulation of the GUI. Direct manipulation can include the use of a pointing device, such as a mouse, a stylus, or a touch sensitive screen, to select from a variety of selectable fields, including selectable menus, drop-down menus, tabs, buttons, bullets, checkboxes, text boxes, and the like. Nevertheless, various embodiments of the integrated gaming system may incorporate any number of additional functional user interface schemes in place of this interface scheme, with or without the use of a mouse or buttons or keys, including for example, a trackball, a touch screen or a voice-activated system.

FIG. 1 shows a depiction of an embodiment of the integrated gaming system 100, an integrated gaming server 102, and an external gaming domain 104, comprised of one or a plurality of external gaming servers 105. In this relation, a server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud.

Figure 2:
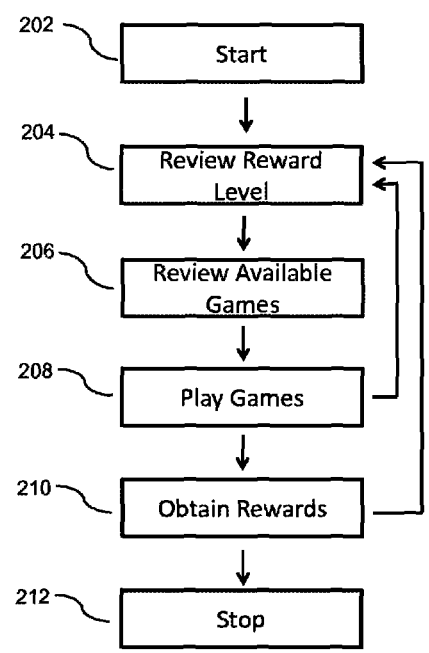
FIG. 2 is a flowchart illustrating steps that may be followed in accordance with one embodiment of the method or process of integrated gaming.

FIG. 2 illustrates a computer-implemented method for integrated gaming. In an embodiment of the method for integrated gaming, the process can begin by proceeding to step 204, "Review Reward Level", in which the current reward level can be reviewed. The reward level is dependent on prior gameplay accomplishments. In this step the reward level is retrieved from memory and viewed via an input/output device, including a screen and a pointing device.

Next, in step 206, "Review Available Games", the games that are available to play can be retrieved from memory and viewed via an input/output device, including a screen and a pointing device. The available games reference available games across a plurality of external gaming platforms, and can be dependent on the level of rewards achieved.

Next, in step 208, "Play Games", a game can be selected and started up via an external gaming server. The game can be played on a game device, which is associated with the selected game. Information about the game and the associated game device is retrieved from memory. During this step, transaction information about gameplay accomplishment and associated reward information is stored in memory.

Finally, in step 210, "Obtain Rewards", a reward can be obtained based on gameplay accomplishments during the Play Games step. The reward status is registered in memory and a reward can be related to an event, such as a user status recognition, a physical prize, a monetary award, or the right to participate in specific gaming or meeting event. Upon completion of the reward event, memory is updated by the processor to reflect completion of the event.

Step 210, "Obtain Rewards", can in a related embodiment include a reward related to a meeting or activity with a notable person, who may or may not be a registered member, for example a celebrity or a high-ranking or professional game player. Such activity or meeting can include a scheduled game session, a physical meeting, a backstage pass at the notable user's event, a lunch, a dinner, or other activities with or concerning the notable person. The particular metadata concerning the event is updated in memory by the processor, and can include information about the type of event and the time at which the event will take place.

FIGS. 1, 2, 4, and 5 are block diagrams and flowcharts methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 1 depicts the computer device 108 of an embodiment, which contains several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include random access memory (RAM) and read-only memory (ROM). The computer also may include nonvolatile storage memory, such as a hard disk drive, where additional data can be stored/

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention, which fall within the true spirit and scope of the invention. This can include alternative configurations, wherein for example the integrated gaming server 102 is executing as a service within an external gaming server 105, or in another variation an integrated gaming server 102 can operate in a distributed manner in the local computing environment, which can include the integrated gaming server operating in a distributed manner on gaming devices 112, such as gaming consoles owned by users of the integrated gaming systems.

Figure 5:
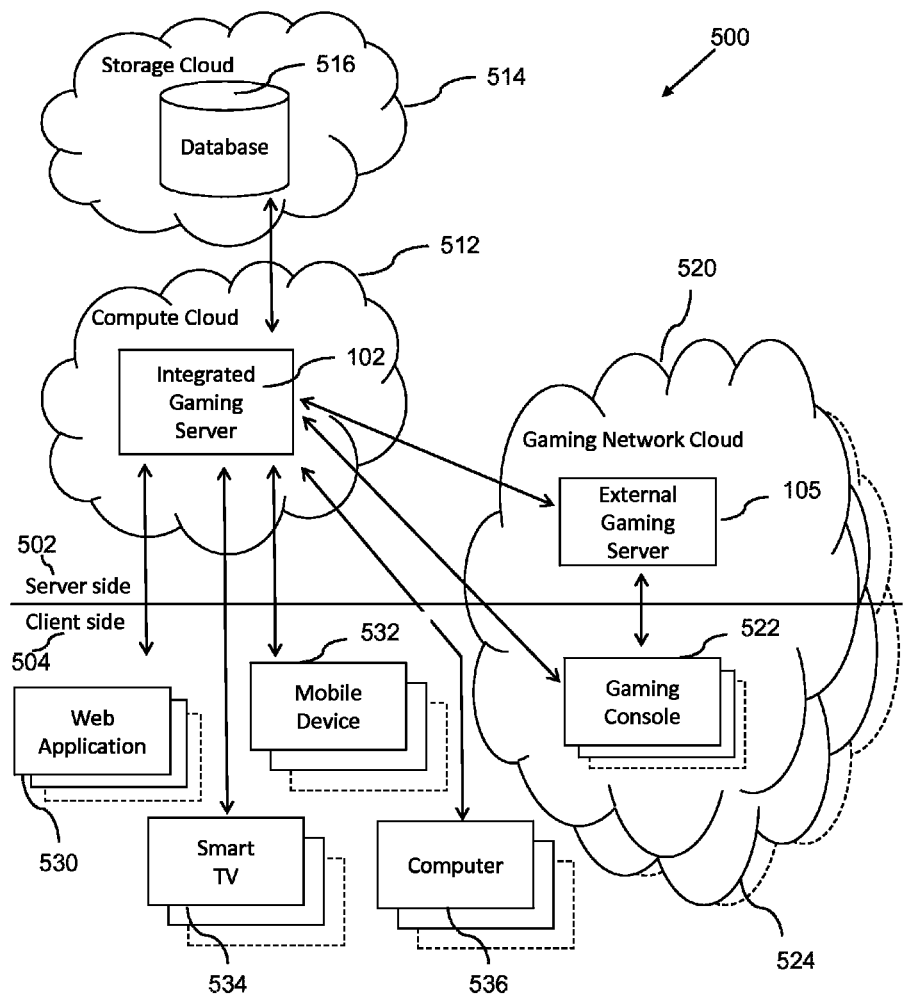
FIG. 5 is a schematic diagram illustrating a system for integrated gaming according to an alternative embodiment of the invention.

FIG. 5 shows an example of such an alternative embodiment 500, in which the integrated gaming server 102 can be reconfigured to execute in a cloud based computing environment, shown as a compute cloud 512. Well known examples of such cloud based computing environments are Amazon EC2 or Microsoft Azure. Furthermore, part of the memory 422, can be allocated in a cloud based storage environment, shown as a storage cloud 514, in which data can be stored in a database 516. Examples of such cloud based storage environments are for example Amazon S3, Microsoft Azure SQL, and many others. FIG. 5 for illustrative purposes shows a division of system components that are respectively server side 502 and client side 504.

The integrated gaming server 102 communicates, via the internet or some other communication channel, with an external gaming server 105, hosted within a first gaming network cloud 520. The external gaming server can be connected to a plurality of gaming consoles 522. The integrated gaming server 102 can communicate indirectly with the gaming consoles 522, via the external gaming server 105, or it can communicate directly with both the external gaming server 105 and the gaming consoles 522.

The integrated gaming server can communicate with a plurality of such gaming networks. FIG. 5 depicts a second gaming network cloud 524.

In a related embodiment, the external gaming server 105 can be configured so that it can perform as a client-side 504 component.

The integrated gaming server 102 can communicate with a number of client components, including
  a. a web application 530, comprised of a variant of the integrated gaming application 106 and the web browser 110;
  b. a mobile device 532; comprised of a variant of the integrated gaming application 106, and a mobile type of computer device 108;
  c. a smart television 534; comprised of a variant of the integrated gaming application 106, and smart television type of computer device 108;
  d. a computer 536; comprised of a variant of the integrated gaming application 106, and a type of computer device 108; and
  e. a gaming console 522; comprised of a variant of the integrated gaming application 106, and a type of gaming device 112;

Many such alternative configurations are readily apparent, and should be considered to be fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. An integrated gaming system for managing game play and tracking and awarding rewards, comprising:
  a. an integrated gaming server, comprising:
    a transaction management component, which is configured to store game transaction information in memory from user gameplay sessions executed in at least one external game server;
    a reward management component; and
    an integrated scoring table;
    such that the reward management component is configured to store reward information, by calculating from the transaction information, via lookup in the integrated scoring table, a record of rewards on a per user basis;
    wherein the reward management component is configured to translate proprietary reward levels in the at least one external game server to an integrated reward, via lookup in the integrated scoring table;
  b. an external gaming domain, comprising the at least one external gaming server, wherein the integrated gaming server communicates with the at least one external gaming server;
  c. an integrated gaming application, wherein the integrated gaming application communicates with the integrated gaming server; and
  d. a local computing platform, wherein the integrated gaming application executes on the local computing platform;
whereby a user can manage and conduct gameplay activities on one or more external gaming servers and associated game devices, such that the integrated gaming server enables the user to compare results on the one or more external gaming servers and the associated game devices.

2. The integrated gaming system of claim 1, further comprising
  a. the integrated gaming server configured with an identity management component, whereby the user can maintain a user profile on the integrated gaming server, and can associate with this a list of external user profiles, such that each external user profile is associated with a specific external gaming server; and b. the integrated gaming server further comprising a gaming server control component, whereby the integrated gaming server can log on to a predetermined external gaming server, with the corresponding external user profile, and perform a multitude of external gaming server functions.

3. The integrated gaming system of claim 1, wherein the local computing platform is a web browser.

4. The integrated gaming system of claim 1, wherein the local computing platform is a gaming device.

5. The integrated gaming system of claim 1, wherein the local computing platform is a computer device.

6. The integrated gaming system of claim 1, wherein the external gaming domain is further comprising a plurality of external gaming servers.

7. The integrated gaming system of claim 1, wherein the integrated gaming server is further comprising a game management component, such that the integrated gaming server is configured to manage a list per user of available games, and the user is enabled to view, select, and start up any one of the available games from the integrated gaming application.

8. The integrated gaming system of claim 7, wherein the integrated gaming server further comprises a league management component, configured such that the user is associated with a tournament league, and tournament league specific games are added to the list of available games.

\* \* \* \* \*